(12) United States Patent
Steinberger et al.

(10) Patent No.: US 10,644,620 B2
(45) Date of Patent: May 5, 2020

(54) METHOD AND DEVICE FOR OPERATING AN ELECTRIC MOTOR

(71) Applicant: Woehner GmbH & Co., KG Elektrotechnische Systeme, Roedental (DE)

(72) Inventors: Philipp Steinberger, Coburg (DE); Daniel Steiner, Mengersgereuth-Haemmern (DE); Hubert Lenker, Sonneberg (DE)

(73) Assignee: Woehner GmbH & Co. KG Elektrotechnische Systeme, Roedental (DE)

( * ) Notice: Subject to any disclaimer, the term of this patent is extended or adjusted under 35 U.S.C. 154(b) by 12 days.

(21) Appl. No.: 15/777,946

(22) PCT Filed: Nov. 24, 2016

(86) PCT No.: PCT/EP2016/078676
§ 371 (c)(1),
(2) Date: May 22, 2018

(87) PCT Pub. No.: WO2017/089461
PCT Pub. Date: Jun. 1, 2017

(65) Prior Publication Data
US 2018/0375446 A1    Dec. 27, 2018

(30) Foreign Application Priority Data
Nov. 24, 2015   (EP) ...................................... 15196051

(51) Int. Cl.
*H02P 1/30* (2006.01)
*H02P 1/02* (2006.01)
(Continued)

(52) U.S. Cl.
CPC ................. *H02P 1/30* (2013.01); *H02P 1/022* (2013.01); *H02P 1/24* (2013.01); *H02P 27/16* (2013.01); *H02P 27/18* (2013.01)

(58) Field of Classification Search
CPC ............. H02P 1/30; H02P 1/022; H02P 27/16
See application file for complete search history.

(56) References Cited

U.S. PATENT DOCUMENTS 6,420,848 B1 *  7/2002  Gritter ...................... H02P 1/28
                                                          318/778
2007/0046247 A1   3/2007  Barie et al.
(Continued)

FOREIGN PATENT DOCUMENTS

DE            3427 479 A1     2/1986
DE      10 2008 057 701 A1    5/2010
(Continued)

OTHER PUBLICATIONS

International Search Report corresponding to International application No. PCT/EP2016/078676, dated Feb. 6, 2017 (13 pages).

*Primary Examiner* — Cortez M Cook
(74) *Attorney, Agent, or Firm* — Maginot, Moore & Beck, LLP (57) ABSTRACT

Device for operating an electric motor, comprising a detection unit for detecting zero-crossings and phase angles of applied phase-shifted sinusoidal voltage phases of a multi-phase power supply network; and a switching unit for connecting half-waves of the applied sinusoidal voltage phases through by means of semiconductor switches in accordance with switching patterns applied to the semiconductor switches, said patterns being synchronised with the detected phase angles and zero-crossings, to generate phase-shifted quasi-sinusoidal voltage phases which are applied directly to the electric motor.

21 Claims, 7 Drawing Sheets

(51) Int. Cl.
*H02P 27/16* (2006.01)
*H02P 1/24* (2006.01)
*H02P 27/18* (2006.01)

(56) References Cited

U.S. PATENT DOCUMENTS

| | | | | |
|---|---|---|---|---|
| 2008/0150471 A1* | 6/2008 | Unsworth | ............... | H02P 1/24 318/771 |
| 2008/0252242 A1* | 10/2008 | Akama | ............... | H02P 6/06 318/400.14 |
| 2009/0267552 A1* | 10/2009 | Li | ............... | H02P 1/40 318/430 |
| 2011/0225442 A1* | 9/2011 | Benecke | ............... | H02P 1/46 713/340 |
| 2015/0333663 A1 | 11/2015 | Wei et al. | | |

FOREIGN PATENT DOCUMENTS

| WO | 2001048908 A1 | 7/2001 |
|---|---|---|
| WO | 2001089074 A1 | 11/2001 |

\* cited by examiner

METHOD AND DEVICE FOR OPERATING AN ELECTRIC MOTOR

This application is a 35 U.S.C. 371 National Stage application of PCT/EP2016/078676, filed Nov. 24, 2016, and claims priority to European Application No. EP 15196051.5, filed on Nov. 24, 2015. The entire contents of the above-mentioned patent applications are incorporated herein by reference as part of the disclosure of this U.S. application.

The invention relates to a method and a device for operating an electric motor and in particular a motor start-up means for starting an electric motor.

Motor start-up means are typically made use of in automation and control technology for actuating pumps, fans, conveyor belts, stirring units, winding machines, separation tools or other tools. Increasingly, higher-efficiency electric motors are being used. Thus, for example, IE3 motors have a higher efficiency than IE2 electric motors. IE3 motors, which are more complex to manufacture, have a higher efficiency but require much higher start-up currents in direct starter operation. Further, the IE2 motors, which are less complex to manufacture, may only be started up in future using rotational speed control.

Further, WO 01/48908 discloses a method and an associated means for operating asynchronous motors having two-phase or three-phase current setters, which are connected to a three-phase network without connecting the star points of the stator coil of the asynchronous motor and supply network and which comprise at least two pairs of thryistors connected antiparallel which are fired at particular times.

DE 10 2008 057701 A1 further discloses a method and an associated means for operating synchronous motors having three-phase current setters which are connected to a three-phase current network, preferably without connecting the star points of the rotor coil of the synchronous motor and three-phase current network.

Moreover, US 2007/046247 A1 discloses a multi-phase alternating current induction motor which is connected to a power supply via a gentle start-up appliance.

Therefore, an object of the present invention is to provide a device and a method which reduce the start-up currents when the electric motors are started up.

This object is achieved according to the invention by a method for operating an electric motor having the features set out in claim 1.

Accordingly, the invention provides a method for operating an electric motor comprising the steps of:
detecting zero-crossings and phase angles of applied phase-shifted sinusoidal voltage phases of a multi-phase power supply network and
connecting half-waves of the applied sinusoidal voltage phases through by means of semiconductor switches in accordance with switching patterns applied to the semiconductor switches, said patterns being synchronised with the detected phase angles and zero-crossings, to generate phase-shifted quasi-sinusoidal voltage phases which are applied directly to the electric motor.

As a result of the method according to the invention, the start-up currents that occur when the electric motor is started up are reduced. This has the advantage that the electric motor is started up gently.

In one possible embodiment of the method according to the invention, the generated phase-shifted quasi-sinusoidal voltage phases have the same frequency as one another, this being a fraction of the network frequency of the multi-phase power supply network.

In a further possible embodiment of the method according to the invention, to start up the electric motor the frequency of the quasi-sinusoidal voltage phases is stepped up incrementally by changing the switching patterns applied to the semiconductor circuits until the network frequency of the voltage supply network is reached.

In a further possible embodiment of the method according to the invention, the semiconductor switches are formed by galvanically separated power semiconductors, which are actuated in accordance with a switching pattern read out from a data store.

In a further possible embodiment of the method according to the invention, the first half-wave and/or the last half-wave of a sinusoidal voltage phase, which is connected through by means of the semiconductor switches in accordance with the applied switching pattern, are truncated to generate the quasi-sinusoidal voltage phases.

In a further possible embodiment of the method according to the invention, after the network frequency of the power supply network is reached the electric motor is supplied directly by the power supply network, via mechanical contacts connected in parallel with the semiconductor switches.

In a further possible embodiment of the method according to the invention, the quasi-sinusoidal voltage phases are at a phase angle of approximately 120° to one another.

In a further possible embodiment of the method according to the invention, when the switching pattern applied to the semiconductor switches is changed the direction of rotation of a rotary field for driving the electric motor is maintained.

The invention further provides a device for operating an electric motor having the features set out in claim 9.

Accordingly, the invention provides a device for operating an electric motor comprising:
a detection unit for detecting zero-crossings and phase angles of applied phase-shifted sinusoidal voltage phases of a multi-phase power supply network and
a switching unit for connecting half-waves of the applied sinusoidal voltage phases through by means of semiconductor switches in accordance with switching patterns applied to the semiconductor switches, said patterns being synchronised with the detected phase angles and zero-crossings, to generate phase-shifted quasi-sinusoidal voltage phases which are applied directly to the electric motor.

In one possible embodiment of the device according to the invention, a control unit is provided, which actuates semiconductor switches of the switching unit in accordance with the switching patterns read out from a data store.

In a further possible embodiment of the device according to the invention, the switching unit is a hybrid switching unit, which has mechanical contacts which are connected in parallel with the semiconductor switches of the switching unit.

In a further possible embodiment of the device according to the invention, the mechanical contacts bridge the semiconductor switches of the switching unit, which are connected in parallel therewith, in continuous operation once the frequency of the quasi-sinusoidal voltage phases reaches the network frequency of the power supply network when the electric motor is started up.

In a further possible embodiment of the device according to the invention, a reversing stage for setting a direction of rotation of a rotary field for driving the electric motor is provided.

In a further possible embodiment of the device according to the invention, an overload protection stage is provided.

The invention further provides a motor start-up means for starting up an electric motor having the features set out in claim 15.

The invention accordingly provides a motor start-up means for starting up an electric motor comprising a device for operating the electric motor, the device comprising:

a detection unit for detecting zero-crossings and phase angles of applied phase-shifted sinusoidal voltage phases of a multi-phase power supply network and a switching unit for connecting half-waves of the applied sinusoidal voltage phases through by means of semiconductor switches in accordance with switching patterns applied to the semiconductor switches, said patterns being synchronised with the detected phase angles and zero-crossings, to generate phase-shifted quasi-sinusoidal voltage phases which are applied directly to the electric motor.

Hereinafter, possible embodiment of the method according to the invention and the device according to the invention for operating an electric motor as well as the motor start-up means according to the invention for starting an electric motor are described in greater detail with reference to the accompanying drawings, in which:

FIG. 8A to 8F are signal graphs illustrating the mode of operation of the method according to the invention and the device according to the invention for operating an electric motor.

Figure 1:
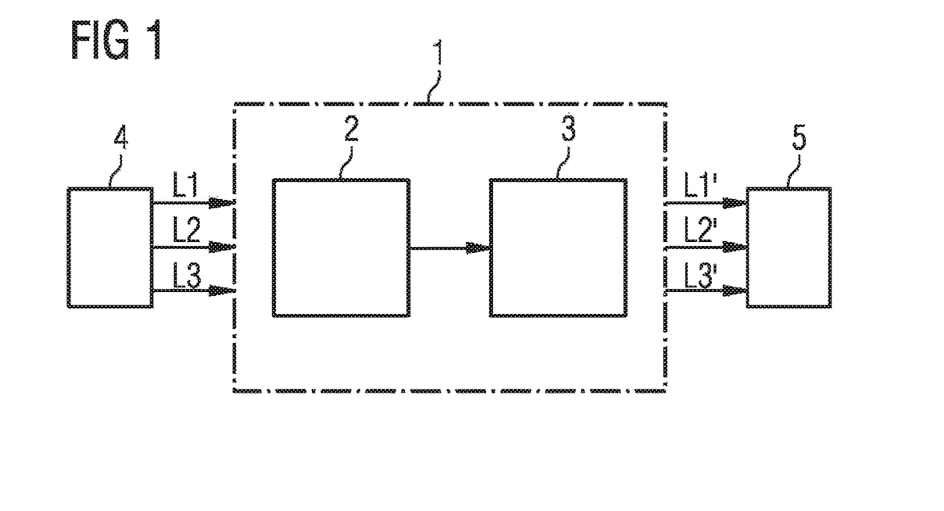
FIG. 1 is a simple block diagram illustrating an embodiment of the device according to the invention for operating an electric motor.

FIG. 1 schematically shows a device 1 for operating an electric motor 5 according to the invention. The device 1 comprises a detection unit 2 and a switching unit 3. The detection unit 2 detects zero-crossings and phase angles of applied phase-shifted sinusoidal voltage phases L of a multi-phase power supply network 4, as shown in FIG. 1. The device 1 further contains a switching unit 3 for connecting half-waves of the applied sinusoidal voltage phases L through by means of semiconductor switches in accordance with switching patterns applied to the semiconductor switches. These switching patterns are synchronised with the zero-crossings and phase angles detected by the detection unit 2, quasi-sinusoidal voltage phases L' being generated which are applied directly to the electric motor 5. In one possible embodiment, the electric motor 5 may be a three-phase asynchronous motor. This three-phase asynchronous motor 5 consists of a stationary stator and a rotating rotor. The multi-phase power supply network 4 is preferably a three-phase power supply network having three voltage phases L1, L2, L3, as shown in FIG. 1. The stator of the electric motor 5 preferably has a three-phase winding supplied with three-phase current. There is no electrical connection between the stator and the rotor within the electric motor 5. The stator of the three-phase asynchronous motor 5 forms a magnetic field which induces currents in the rotor of the three-phase asynchronous motor via an air gap. Preferably, both the stator and the rotor are made of highly magnetisable electrical steel. This guarantees low hysteresis and low eddy current losses. A plurality of individual windings form the stator winding of the stator. These individual windings are preferably arranged offset from one another at an angle of approximately 120°. In one possible embodiment, the rotor of the asynchronous electric motor may consist of a grooved cylindrical rotor sheet package. In one possible embodiment, these grooves of the rotor may be filled with aluminium rods. Using rings attached at the end faces, these rods are connected to form a closed cage. In a three-phase asynchronous motor 5, a voltage is induced in the rotor by way of the magnetic field.

Figure 2:
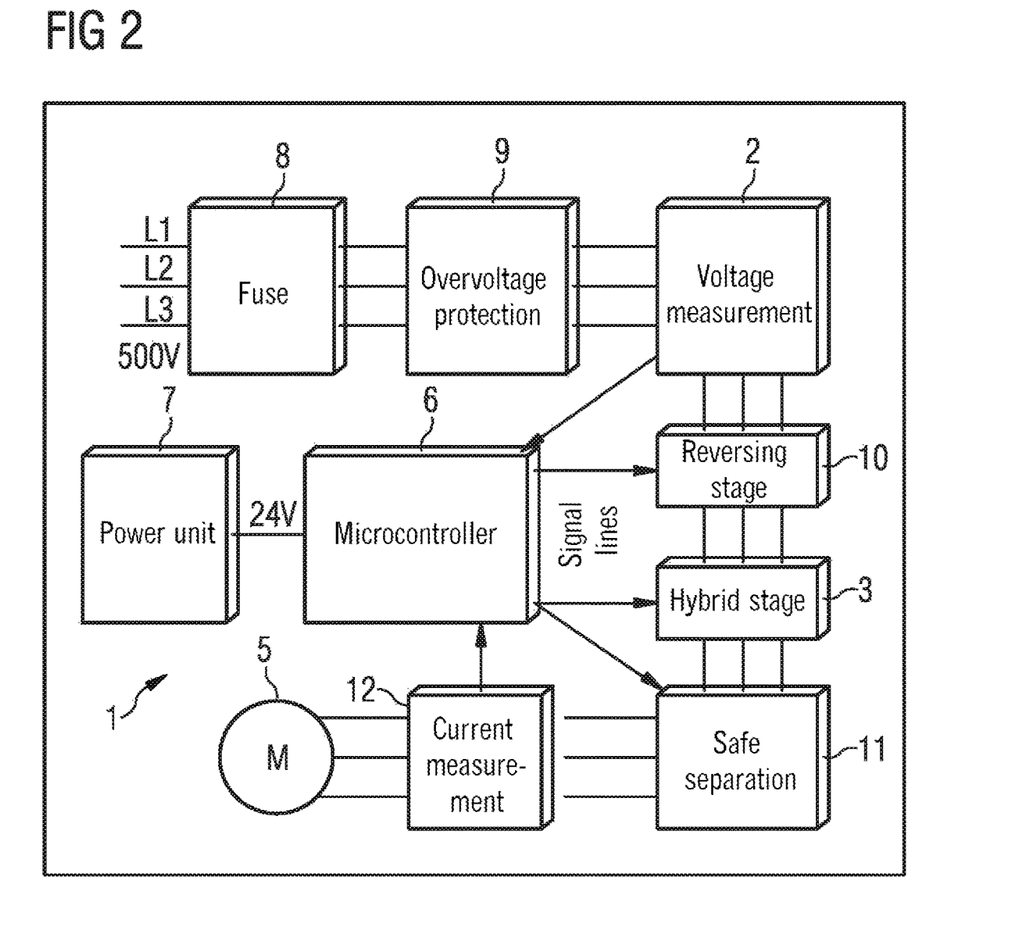
FIG. 2 is a block diagram illustrating an embodiment of a motor start-up means according to the invention which uses a device for operating an electric motor.

FIG. 2 is a block diagram of an example embodiment of a motor start-up means according to the invention which is used by the device 1 according to the invention for operating an electric motor according to FIG. 1. As can be seen from FIG. 2, a control unit 6 which actuates switches of the switching unit 3 is provided in the device 1 shown. In the embodiment shown in FIG. 2, the switching unit 3 is a hybrid switching unit or a hybrid stage, which has mechanical contacts which are connected in parallel with the semiconductor switches of the switching unit 3. In one possible embodiment, the control unit 6 is formed by a microcontroller, which is supplied with a supply voltage by a power unit 7. The motor start-up means, as shown in FIG. 2, has protective functions for protecting the electric motor 5 being operated. To operate the electric motor 5 safely, it is to be protected from overload and switched off in the event of a short circuit. A unit 8 has fuses for protecting against short circuit currents. An overvoltage protection stage 9 is further provided. Downstream from this is a unit 2 for voltage measurement. The unit 2 serves to detect zero-crossings and phase angles of the applied phase-shifted sinusoidal voltage phases L1, L2, L3 of the three-phase power supply network 4. In the embodiment shown in FIG. 2, the detection unit 2 is connected to a reversing stage 10 for a reversing operation. At the output, this reversing stage 10 is connected to the switching unit 3, as shown in FIG. 2. The reversing stage 10 is optionally provided. Further, in an alternative embodiment, the reversing stage 10 may be downstream from the switching stage 3. The switching unit 3 is preferably a hybrid switching unit which, in addition to semiconductor switches, in particular power semiconductors, has mechanical contacts. These mechanical contacts are connected in parallel with the semiconductor switches of the switching unit 3. If the frequency f of the quasi-sinusoidal voltage phases L' reaches the network frequency of the power supply network 4 when the electric motor 5 is started up, the mechanical contacts bridge the semiconductor switches of the switching unit 3, which are connected in parallel therewith, in continuous operation. In one possible embodiment, the semiconductor switches of the hybrid switching unit 3 are TRIACs. Alternatively, the semiconductor switch may also comprise other power semiconductors, in particular thyristors or IGBTs. In one possible embodiment of the hybrid switching unit 3, the switching mechanical contacts are each implemented using a relay. A semiconductor switch, for example a TRIAC, is connected in parallel with the relay contact and prevents an arc from igniting during the switching process. The mechanical wear on the relay contacts or mechanical contacts is greatly reduced as a result. Because of the mechanical relay contacts, the power loss is greatly reduced in continuous operation. For highly inductive loads, in particular electric motors or electric motors, large or intense arcs may occur in the contacts upon separation as a result of the inductivity. This is prevented in the switching unit 3 by the hybrid function.

In one possible embodiment, there is a separating stage 11 downstream from the hybrid switching stage 3 for safe separation, as shown in FIG. 2. In one possible embodiment, this separating stage 11 comprises at least one series relay, which is for example provided for safe separation of the phase L2. Further, as shown in FIG. 2, a unit 12 for current measurement is provided, which measures the current when the electric motor 5 is ramping up or starting up and reports it to the control unit or microcontroller 6. Using the measured current, in one possible embodiment it can be determined by way of a tripping curve when and starting from what overcurrent the electric motor 5 should be switched off. The electric motor 5 is preferably switched off before said electric motor 5 can be damaged by the excessive current.

Figure 3:
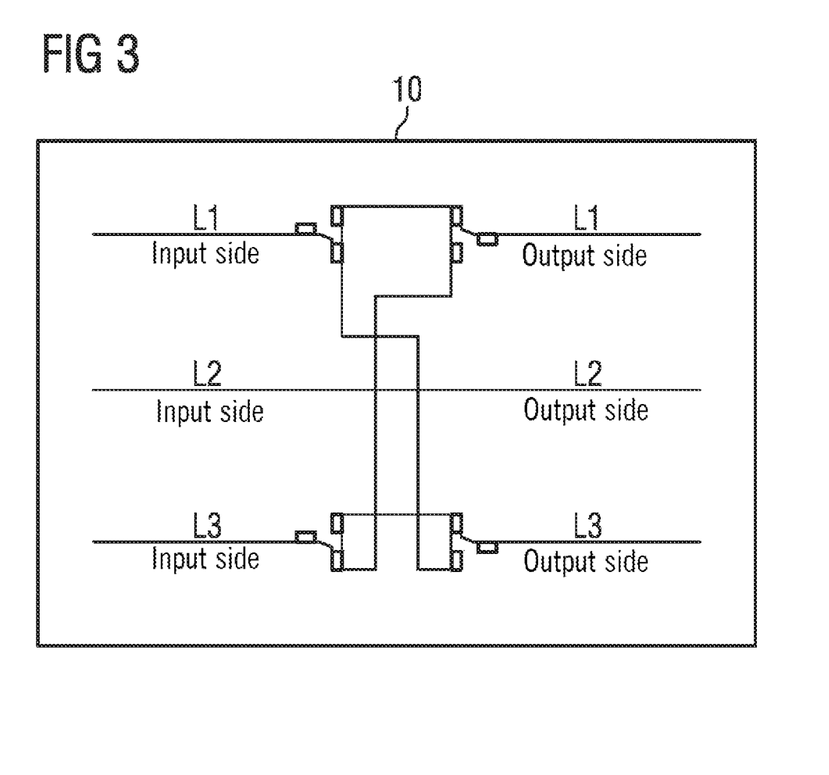
FIG. 3 is a circuit diagram illustrating an embodiment of a reversing stage usable in the motor start-up means according to the invention.

FIG. 3 is a circuit diagram of a reversing stage 10 usable in the device according to the invention. The reversing stage 10 provides a reversing function and determines the direction of rotation of the electric motor 5 by swapping the phases L1 and L3. The reversing stage 10 makes it possible to set the direction of rotation of the electric motor 5 and if applicable to change to normal operation. The reversing stage 10 and the hybrid stage 3 are actuated by the control unit 6 via control lines. This takes place as a function of signals transmitted to the control unit 6 by the detection unit 2 and/or by the current measurement unit 12.

Figure 5:
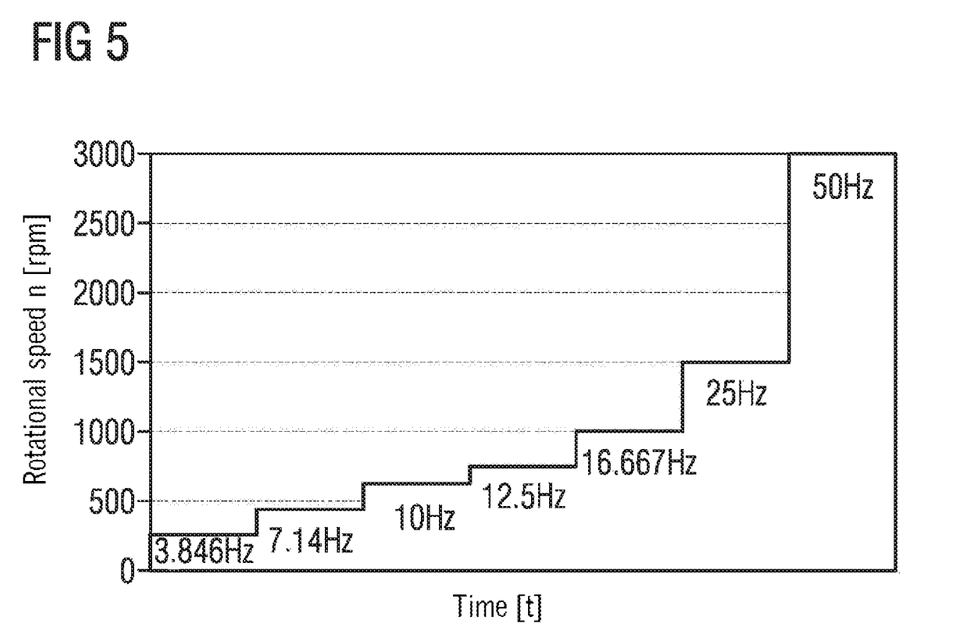
FIG. 5 is a graph illustrating starting up an electric motor operated using the device according to the invention.

FIG. 5 is a signal graph illustrating the mode of operation of the device according to the invention for operating an electric motor 5 and the mode of operation of a motor start-up means according to the invention. FIG. 5 schematically shows a two-pole electric motor 5 ramping up over time, the rotational speed n of the electric motor 5 increasing incrementally. For each phase L of the power supply network 4, a power semiconductor, for example a TRIAC, is installed in the hybrid switching unit 3. By means of this semiconductor switch, the voltage progression is influenced in such a way that only particular parts of the sinusoidal voltage phases are connected through. In order for the electric motor 5 to rotate uniformly, the three phases of the three-phase network L1, L2, L3 are at a phase angle of approximately 120° to one another. The order of the voltage phases is also important, since they determine the direction of rotation of the electric motor 5. In the method according to the invention and the device according to the invention, quasi-sinusoidal voltage phases L', corresponding to the sinusoidal voltage phases at a lower frequency, are generated using half-waves of the applied sinusoidal voltage phases L at a predetermined network frequency of for example 50 Hz. Signal portions or half-waves of the sinusoidal signal phases L are connected through as a function of switching patterns, and form quasi-sinusoidal voltage phases L', the frequency of which is a fraction of the network frequency $f_0$. The generated quasi-sinusoidal voltage phases L', which are phase-shifted with respect to one another, have the same frequency f as one another, this being a fraction of the network frequency $f_0$ of the multi-phase power supply network. As can be seen from the graph of FIG. 5, in the embodiment shown a quasi-sinusoidal voltage phase L' having a frequency of 3.846 Hz is initially generated, corresponding to a seventh of the network frequency $f_0$ of 50 Hz. Subsequently, a quasi-sinusoidal voltage phase L' having a 7.14 Hz sine voltage is generated, in other words having a frequency corresponding to a sixth of the normal network frequency $f_0$. The generated phase-shifted quasi-sinusoidal voltage phases L', in other words L1', L2', having the same frequency as one another during each switching phase, this corresponding to a fraction of the network frequency $f_0$=50 Hz of the multi-phase power supply network 4. Thus, in the first switching stage according to FIG. 5, all three quasi-sinusoidal voltage phases L1', L2', L3', which are phase-shifted with respect to one another, have a network frequency of 3.856 Hz, in other words a thirteenth of the network frequency. In the second switching phase, the three phase-shifted quasi-sinusoidal voltage phases L1', L2', L3' have the same frequency, specifically 7.14 Hz, in other words a seventh of the network frequency etc. To start up the electric motor 5, the frequency f of the quasi-sinusoidal voltage phases L1', L2', L3' is stepped up incrementally by changing the switching patterns applied to the semiconductor switches of the switching unit 3 until the network frequency $f_0$=50 Hz of the power supply network 4 is reached. In the embodiment shown in FIG. 5, the electric motor 5 is started up in seven switching phases, the frequency of the quasi-sinusoidal voltage phases L1' being stepped up in each switching phase, specifically from 3.85 Hz to 7.14 Hz, to 10 Hz, to 12.5 Hz, to 16.67 Hz, to 25 Hz and finally to 50 Hz. By stepping up the rotational speed incrementally in this way, as shown in FIG. 5, it is possible to start the electric motor 5 gently. This also reduces the start-up currents. The switches of the switching unit 3 are preferably formed by galvanically separated power semiconductors, in particular TRIACs, which are actuated in accordance with a switching pattern read out from a data store. In one possible embodiment, the control unit 6 or the microcontroller has access to a data store of this type, in which predetermined switching patterns are stored. In one possible embodiment, a programmable data store is located in the switching unit 6 and can be programmed with corresponding switching patterns via an interface. After the network frequency of $f_0$=50 Hz of the power supply network 4 is reached, the electric motor 5 is preferably supplied with voltage phases L directly via mechanical contacts connected in parallel with the semiconductor switches of the switching unit 3. When the switching pattern applied to the semiconductor switches of the switching unit 3 is switched, the direction of rotation of a rotational field for driving the electric motor 5 is maintained. The quasi-sinusoidal voltage phases L' are each at a phase angle of 120° to one another.

Figure 6A:
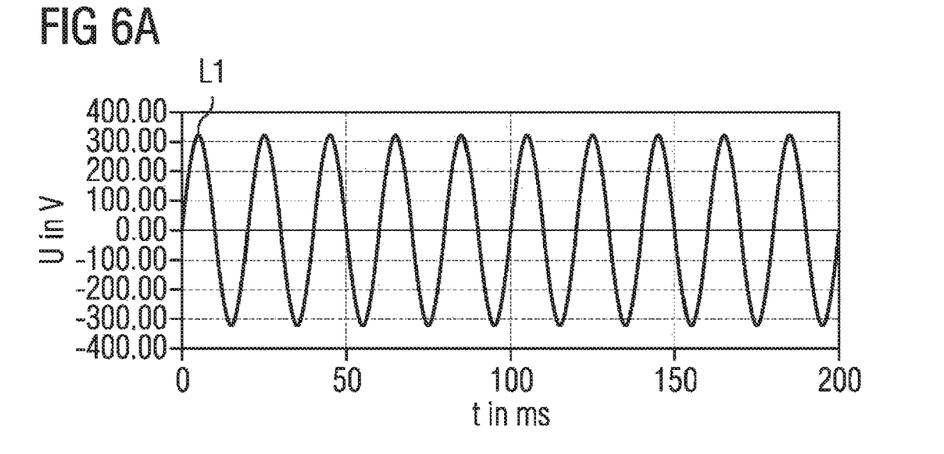
FIG. 6A, 6B, 6C are signal graphs describing the mode of operation of the method according to the invention and the device according to the invention for operating an electric motor.
Figure 6B:
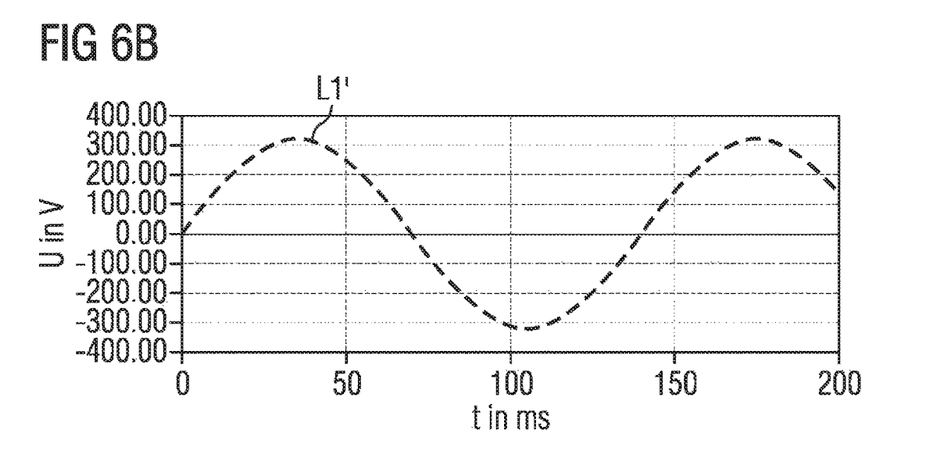
Figure 6C:
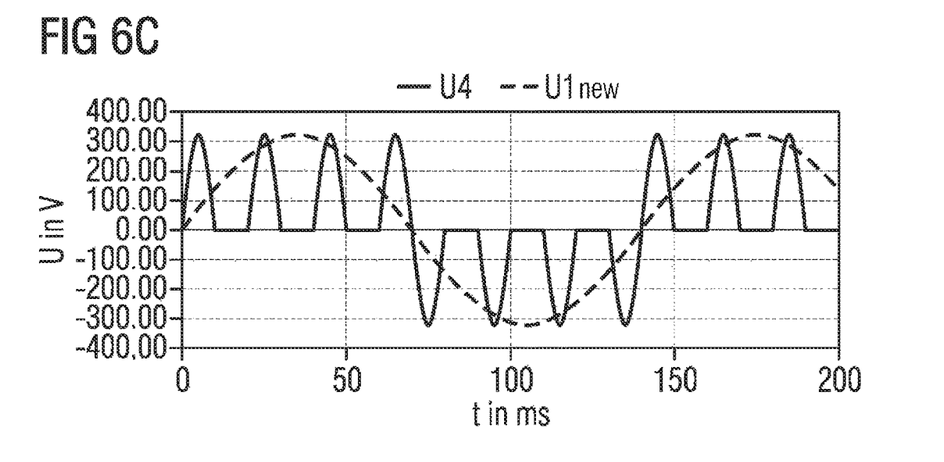

FIG. 6A, 6B, 6C illustrate the mode of operation of the method according to the invention and of the device according to the invention for operating an electric motor. FIG. 6A shows an unaffected 50 Hz network voltage of a power supply network 4. The period length is 20 ms and the voltage phase L is a uniformly sinusoidal signal, as can be seen in FIG. 6A. FIG. 6B shows a desired sinusoidal voltage having a frequency of 7.14 Hz, in other words a seventh of the network frequency. In this case, the period length is 140 ms. So as to generate a quasi-sinusoidal voltage phase L' having a frequency of 7.14 Hz from the sinusoidal voltage phase L of the power supply network, switching patterns are used, as shown in FIG. 6C. The switching pattern U4 for 7.14 Hz comprises four positive and four negative half-waves, as shown in FIG. 6C. These eight half-waves result in an imitation of the desired sinusoidal voltage U1new at a frequency of 7.14 Hz. In one possible embodiment, for optimisation, the first half-wave and/or the last half-wave of the quasi-sinusoidal voltage phase L, which is connected through in accordance with the applied switching pattern by means of a power semiconductor, for example TRIAC, are truncated to generate the quasi-sinusoidal voltage phase L1'. In the example shown in FIG. 6C, the first and last half-wave of each half-wave package can each be truncated at a phase of 90°. This makes the voltage progression even more similar to a sinusoidal voltage progression.

Figure 7:
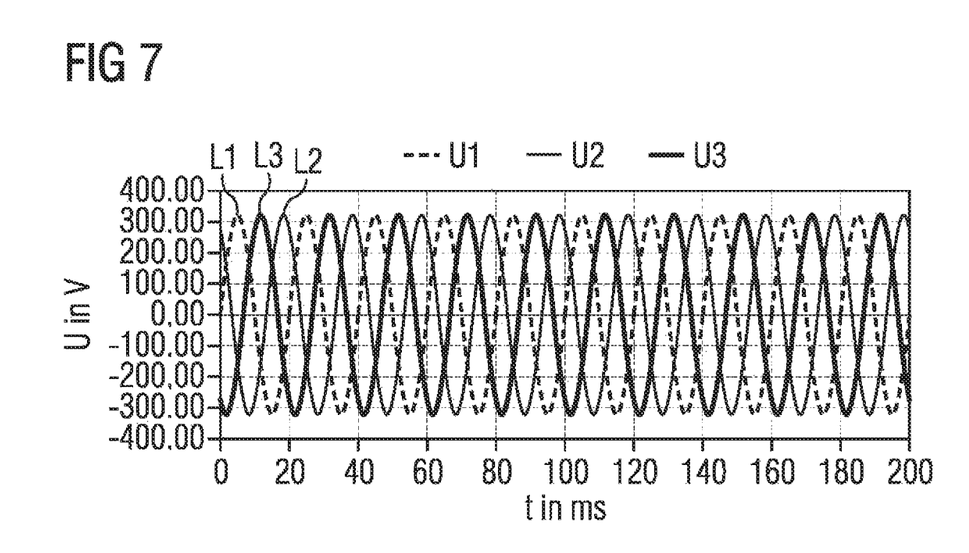
FIG. 7 is a signal graph illustrating a network voltage of a three-phase power supply network.

FIG. 7 schematically shows the sinusoidal voltage phases L1, L2, L3 provided by a three-phase power supply network 4, which are each phase-shifted through 120° with respect to one another, and the switching patterns U1, U2, U3.

Figure 8A:
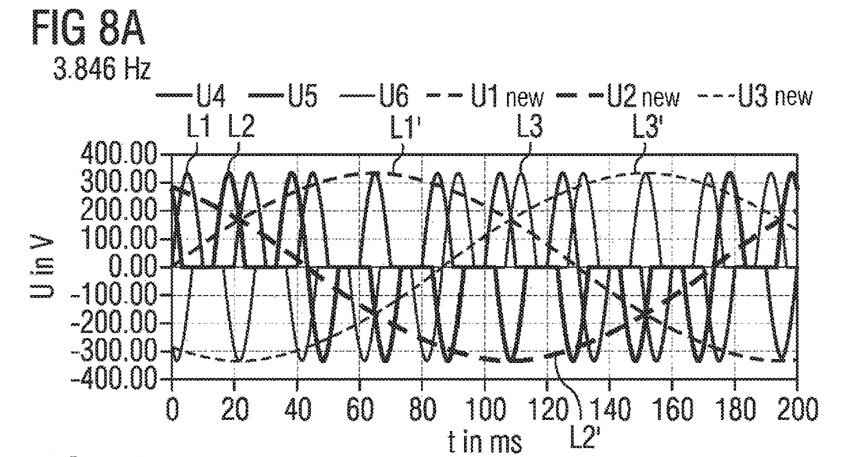
Figure 8B:
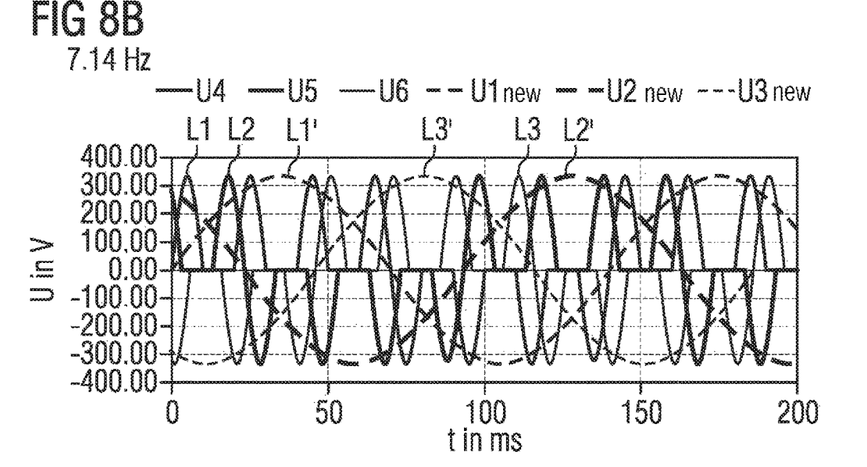
Figure 8C:
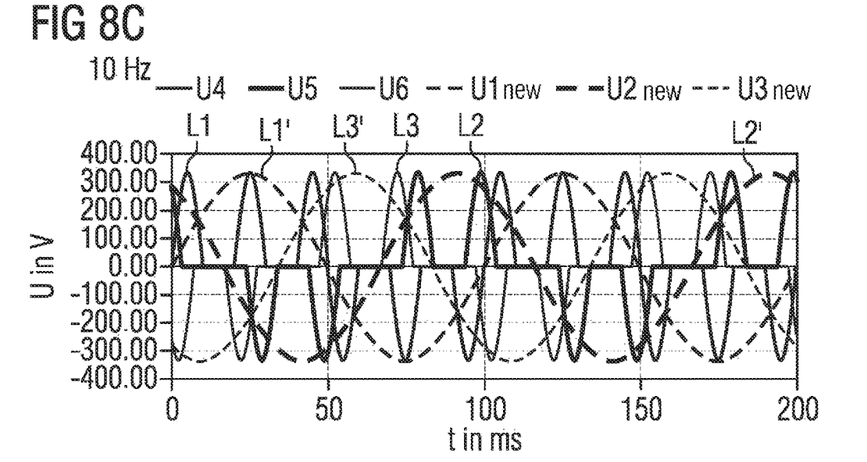
Figure 8D:
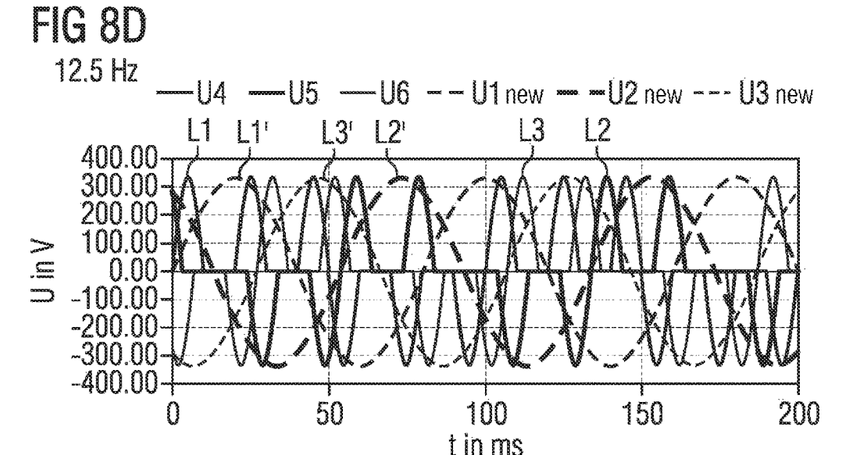
Figure 8E:
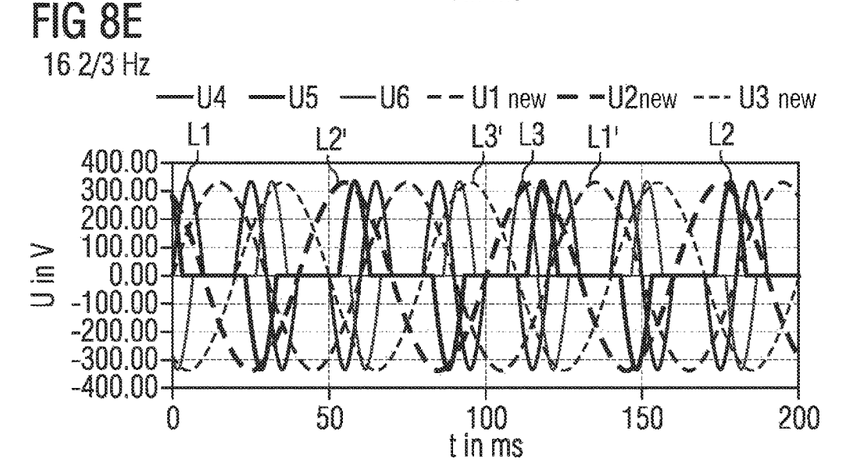
Figure 8F:
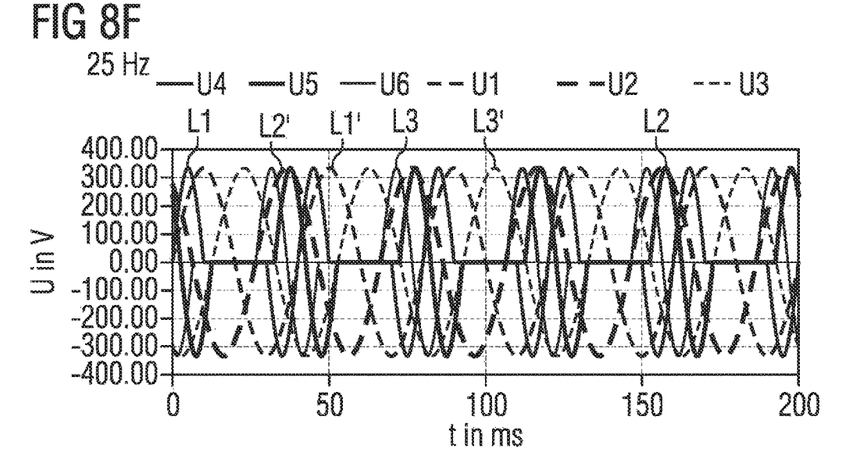

FIG. 8A to 8F illustrate the quasi-sinusoidal voltage phases L', generated using the method according to the invention and the device according to the invention, for the various switching phases and the switching patterns U4, U5, U6 used in this context, as well as the sinusoidal voltages U1new, U2new, U3new. FIG. 8A shows the first switching phase for generating quasi-sinusoidal voltage phases L' at a frequency of 3.846 Hz, in other words a thirteenth of the network frequency $f_0$=50 Hz. FIG. 8B shows the quasi-sinusoidal voltage phases L' at a frequency of 7.14 Hz, in other words a seventh of the network frequency, in the second switching phase for starting up the electric motor 5. FIG. 8C shows the quasi-sinusoidal voltage phases in the third switching phase, which have a frequency of 10 Hz, in other words a fifth of the network frequency $f_0$. FIG. 8D shows the quasi-sinusoidal voltage phases in the fourth switching phase at a frequency of 12.5 Hz, in other words a quarter of the network frequency $f_0$. FIG. 8E shows the quasi-sinusoidal voltage phases in the fifth switching phase at a frequency of 16⅔ Hz, in other words a third of the network frequency $f_0$. FIG. 8F shows the quasi-sinusoidal voltage phases L' in the sixth switching phases at a frequency of 25 Hz, in other words half the network frequency $f_0$.

Using the method according to the invention and the device according to the invention, quasi-sinusoidal voltage phases L1' are generated from purely sinusoidal voltage phases L from the public three-phase power supply network 4 and applied directly to the electric motor 5. The device according to the invention does not require either a DC intermediate circuit or an energy store.

Figure 4:
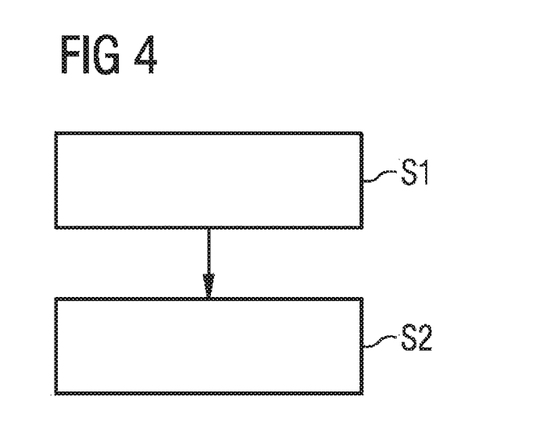
FIG. 4 is a simple flow chart illustrating an embodiment of the method according to the invention for operating an electric motor.

FIG. 4 schematically shows an embodiment of the method according to the invention for operating an electric motor 5.

In a first step S1, zero-crossings and phase angles of applied phase-shifted sinusoidal voltage phases L of a multi-phase power supply network 4, in particular a three-phase power supply network, are detected.

In a further step S2, half-waves of applied sinusoidal voltage phases L are connected through by means of semiconductor switches in accordance with switching patterns applied to the semiconductor switches, said patterns being synchronised with the detected phase angles and zero-crossings, phase-shifted quasi-sinusoidal voltage phases L' being generated and being applied directly to the electric motor 5. Using the method according to the invention the start-up currents are reduced when an electric motor 5 is started up. Moreover, the electric motor 5 is started up gently. Using the method according to the invention, it is possible for example to operate IE3 motors using limited start-up currents. IE2 electric motors can also be operated using the device according to the invention. By means of the device according to the invention, an electronic circuit (frequency setter circuit) can be used which draws defined portions from the public three-phase power supply network and supplies them to the load or the electric motor. In the primary electrical circuits of the frequency setter circuit, there are no connections between the current phases, and so the public power supply network is not disrupted in the event of a fault. The device according to the invention preferably uses hybrid technology. The switching processes are carried out by semiconductor elements, whilst continuous currents are passed through mechanical contacts.

The invention claimed is:

1. Method for operating an electric motor, comprising the steps of:
   (a) detecting zero-crossings and phase angles of applied phase-shifted sinusoidal voltage phases of a multi-phase power supply network; and
   (b) connecting half-waves of the applied sinusoidal voltage phases by means of semiconductor switches in accordance with switching patterns applied to the semiconductor switches, said patterns being synchronised with the detected phase angles and zero-crossings, to generate phase-shifted quasi-sinusoidal voltage phases which are applied directly to the electric motor, wherein to start up the electric motor the frequency of the quasi-sinusoidal voltage phases is stepped up incrementally by changing the switching patterns applied to the semiconductor circuits until the network frequency of the voltage supply network is reached, wherein after the network frequency of the power supply network is reached the electric motor is supplied directly by the power supply network, via mechanical contacts connected in parallel with the semiconductor switches.

2. Method according to claim 1, wherein the generated phase-shifted quasi-sinusoidal voltage phases have the same frequency as one another, this being a fraction of the network frequency of the multi-phase power supply network.

3. Method according to claim 2, wherein the semiconductor switches are formed by galvanically separated power semiconductors, which are actuated in accordance with a switching pattern read out from a data store.

4. Method according to claim 2, wherein the quasi-sinusoidal voltage phases are at a phase angle of approximately 120° to one another.

5. Method according to claim 2, wherein when the switching pattern applied to the semiconductor switches is changed the direction of rotation of a rotary field for driving the electric motor is maintained.

6. Method according to claim 1, wherein the semiconductor switches are formed by galvanically separated power semiconductors, which are actuated in accordance with a switching pattern read out from a data store.

7. Method according to claim 6, wherein the first half-wave and/or the last half-wave of a sinusoidal voltage phase, which is connected through by means of the semiconductor switches in accordance with the applied switching pattern, are truncated to generate the quasi-sinusoidal voltage phases.

8. Method according to claim 6, wherein the quasi-sinusoidal voltage phases are at a phase angle of approximately 120° to one another.

9. Method according to claim 6, wherein when the switching pattern applied to the semiconductor switches is changed the direction of rotation of a rotary field for driving the electric motor is maintained.

10. Method according to claim 1, wherein the quasi-sinusoidal voltage phases are at a phase angle of approximately 120° to one another.

11. Method according to claim 10, wherein when the switching pattern applied to the semiconductor switches is changed the direction of rotation of a rotary field for driving the electric motor is maintained.

12. Method according to claim 1, wherein when the switching pattern applied to the semiconductor switches is changed the direction of rotation of a rotary field for driving the electric motor is maintained.

13. Method according to claim 1, wherein the method is a method for operating a three-phase asynchronous motor.

14. Device for operating an electric motor, comprising:
a detection unit for detecting zero-crossings and phase angles of applied phase-shifted sinusoidal voltage phases of a multi-phase power supply network; and
a switching unit for connecting half-waves of the applied sinusoidal voltage phases by means of semiconductor switches in accordance with switching patterns applied to the semiconductor switches, said patterns being synchronised with the detected phase angles and zero-crossings, to generate phase-shifted quasi-sinusoidal voltage phases which are applied directly to the electric motor, wherein the switching unit is a hybrid switching unit, which has mechanical contacts which are connected in parallel with the semiconductor switches of the switching unit,
wherein a control unit is provided which is configured and operable to actuate semiconductor switches of the switching unit in accordance with the switching patterns read out from a data store,
wherein to start up the electric motor the frequency of the quasi-sinusoidal voltage phases is stepped up incrementally by the switching unit by operation of the control unit changing the switching patterns applied to the semiconductor circuits until the network frequency of the voltage supply network is reached, wherein after the network frequency of the power supply network is reached the electric motor is supplied directly by the power supply network, via mechanical contacts connected in parallel with the semiconductor switches.

15. Device according to claim 14, wherein the mechanical contacts bridge the semiconductor switches of the switching unit, which are connected in parallel therewith, in continuous operation once the frequency of the quasi-sinusoidal voltage phases reaches the network frequency of the power supply network when the electric motor is started up.

16. Device according to claim 14, wherein a reversing stage for setting a direction of rotation of a rotary field for driving the electric motor is provided.

17. Device according to claim 14, wherein an overload protection stage is provided.

18. Motor start-up means for starting up an electric motor, comprising a device according to claim 14.

19. Device according to claim 15, wherein a reversing stage for setting a direction of rotation of a rotary field for driving the electric motor is provided.

20. Device according to claim 14, wherein the device is a device for operating a three-phase asynchronous motor.

21. Motor start-up means according to claim 18, wherein the motor start-up means is a motor start-up means for starting up a three-phase asynchronous motor.

* * * * *